(12) United States Patent
Mishra et al.

(10) Patent No.: US 10,584,984 B2
(45) Date of Patent: Mar. 10, 2020

(54) METER ASSEMBLY

(71) Applicants: DENSO International America, Inc., Southfield, MI (US); DENSO CORPORATION, Kariya, Aichi-pref. (JP)

(72) Inventors: Ramesh Mishra, Troy, MI (US); Amol Deshmukh, Canton, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/727,963

(22) Filed: Oct. 9, 2017

(65) Prior Publication Data

US 2019/0107418 A1   Apr. 11, 2019

(51) Int. Cl.
| | |
|---|---|
| *G01D 13/04* | (2006.01) |
| *F21V 8/00* | (2006.01) |
| *F21V 19/00* | (2006.01) |
| *B60K 37/02* | (2006.01) |
| *G01D 11/28* | (2006.01) |

(52) U.S. Cl.
CPC .............. *G01D 13/04* (2013.01); *B60K 37/02* (2013.01); *F21V 19/003* (2013.01); *G01D 11/28* (2013.01); *G02B 6/0001* (2013.01)

(58) Field of Classification Search
CPC ...... G01D 13/04; F21V 19/003; G02B 6/0001
See application file for complete search history.

(56) References Cited

U.S. PATENT DOCUMENTS

| | | | | |
|---|---|---|---|---|
| 5,997,161 | A * | 12/1999 | Stringfellow | B60K 37/02 362/23.15 |
| 6,025,820 | A * | 2/2000 | Salmon | B60K 37/02 116/286 |
| 6,520,654 | B2 * | 2/2003 | Angell | B60K 37/02 116/DIG. 36 |
| 7,385,489 | B2 * | 6/2008 | Slave | B60K 37/02 340/426.26 |
| 7,427,143 | B1 * | 9/2008 | Coon | G01D 11/28 116/286 |
| 8,089,351 | B2 * | 1/2012 | Eich | B60K 37/02 340/425.5 |
| 8,138,901 | B2 * | 3/2012 | Bowden | B60K 37/02 340/438 |
| 10,293,691 | B2 * | 5/2019 | Mishra | G01D 11/28 |

FOREIGN PATENT DOCUMENTS

JP        2016011841 A        1/2016

* cited by examiner

*Primary Examiner* — Seung H Lee
(74) *Attorney, Agent, or Firm* — Harness, Dickey & Pierce, P.L.C.

(57) ABSTRACT

A meter assembly for a vehicle instrument panel. The meter assembly includes a plurality of plates stacked in alignment with each other. Each one of the plurality of plates includes a first alignment member. All of the first alignment members are aligned along a vertical alignment plane of the meter assembly, which extends perpendicular to a horizontal alignment plane of the meter assembly. The plurality of plates includes a printed circuit, a case, and an instrument dial. The printed circuit board includes a plurality of light emitting elements. The case includes a plurality of light guides aligned with the light emitting elements. The instrument dial has graphics illuminated by the light emitting elements.

17 Claims, 4 Drawing Sheets

METER ASSEMBLY

FIELD

The present disclosure relates to a meter assembly for a vehicle, such as for a vehicle instrument panel.

BACKGROUND

This section provides background information related to the present disclosure, which is not necessarily prior art.

Vehicles typically include a meter assembly arranged at an instrument panel of the vehicle. The meter assembly displays information to a driver of the vehicle that is relevant to vehicle operation. For example, the meter assembly will typically include speed of the vehicle, engine speed, engine temperature, etc.

Meter assemblies typically include a plurality of plates stacked in alignment with one another. The plates often include a circuit board with light emitting diodes, a case with light guides, and a dial having indicators illuminated by the LED's. While current meter assemblies are suitable for their intended use, they are subject to improvement. For example, the plates of current meter assemblies include alignment members that are misaligned amongst the different plates, which makes assembly of current meter assemblies difficult, time consuming, and costly. Furthermore, the light guides of current meter assemblies must be elongated to prevent shadows on the graphics of the main dial, which requires current meter assemblies to have a thickness that is greater than often desired. The present teachings provide for improved meter assemblies that address these issues, as well as numerous others.

SUMMARY

This section provides a general summary of the disclosure, and is not a comprehensive disclosure of its full scope or all of its features.

The present teachings provide for a meter assembly for a vehicle instrument panel. The meter assembly includes a plurality of plates stacked in alignment with each other. Each one of the plurality of plates includes a first alignment member. All of the first alignment members are aligned along a vertical alignment plane of the meter assembly, which extends perpendicular to a horizontal alignment plane of the meter assembly. The plurality of plates includes a printed circuit, a case, and an instrument dial. The printed circuit board includes a plurality of light emitting elements. The case includes a plurality of light guides aligned with the light emitting elements. The instrument dial has graphics illuminated by the light emitting elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
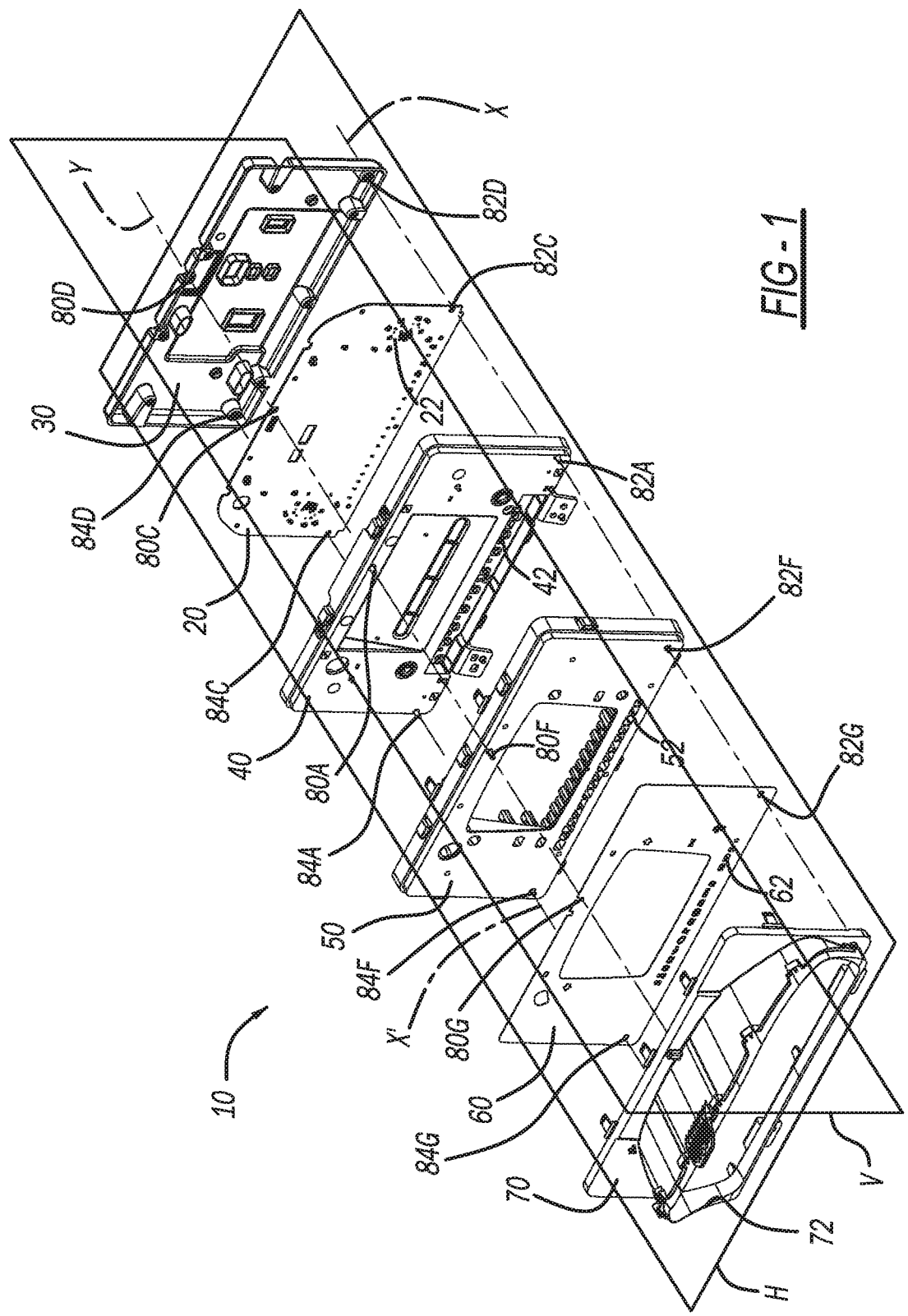
Figure 2:
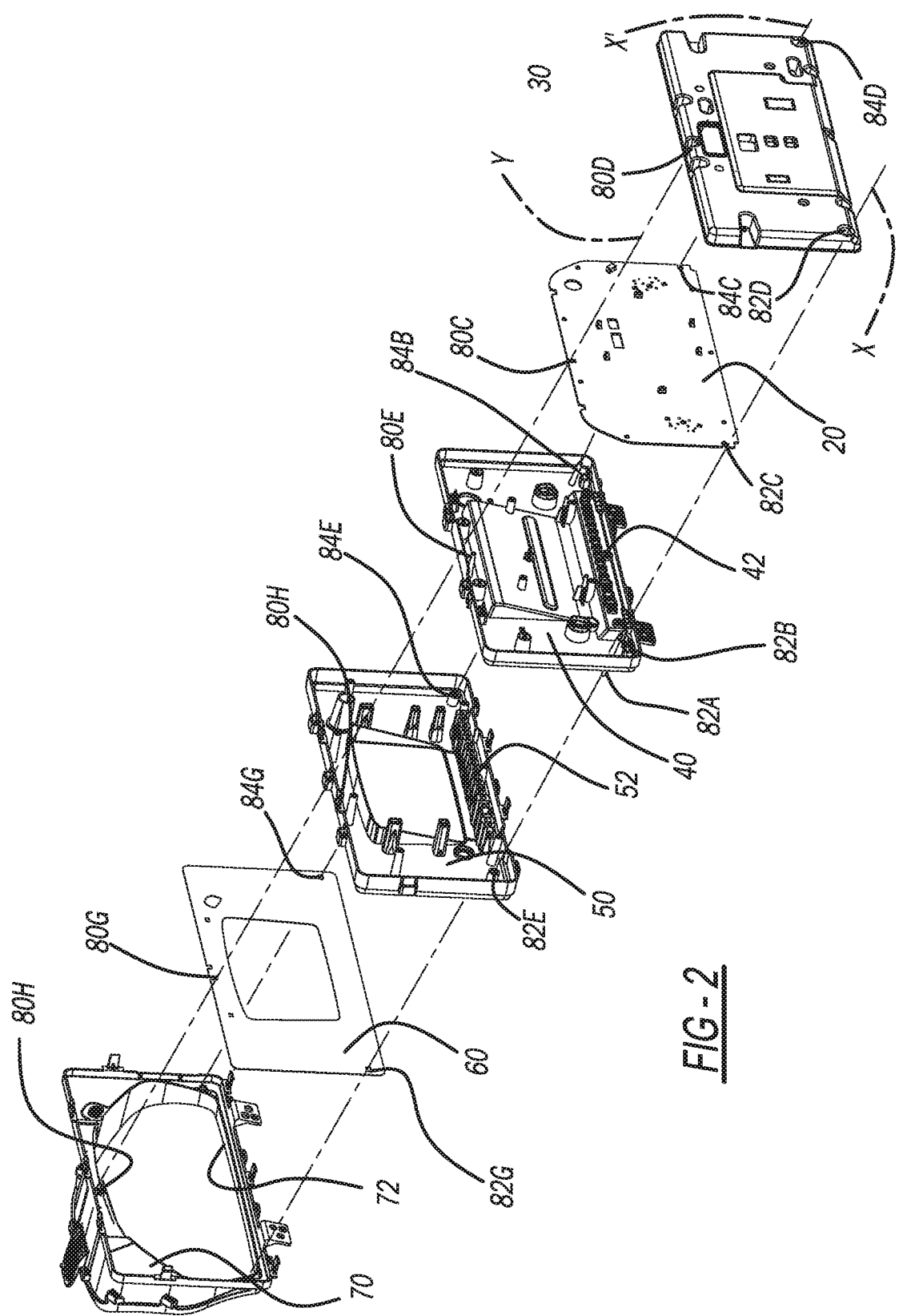
Figure 3:
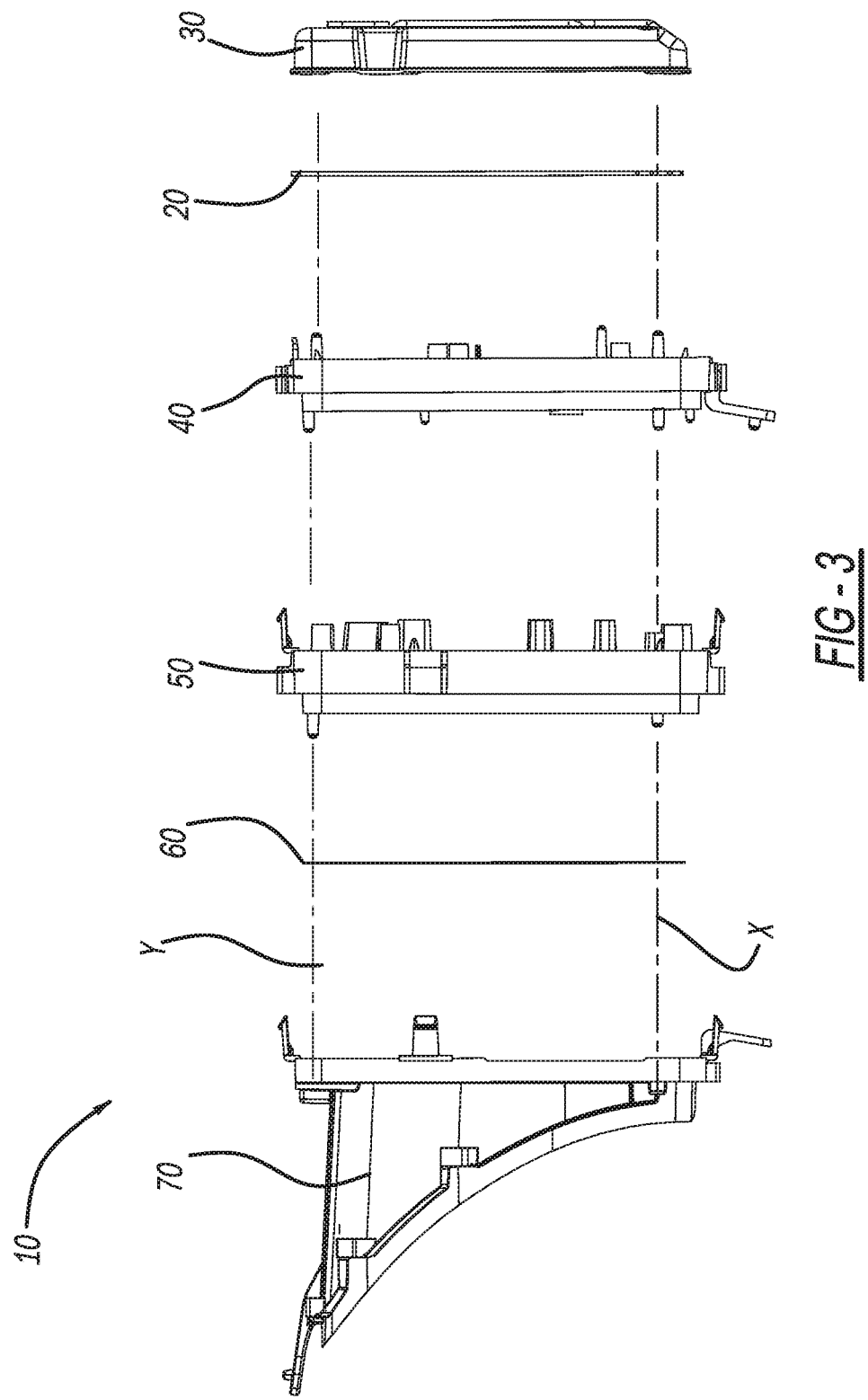
Figure 4:
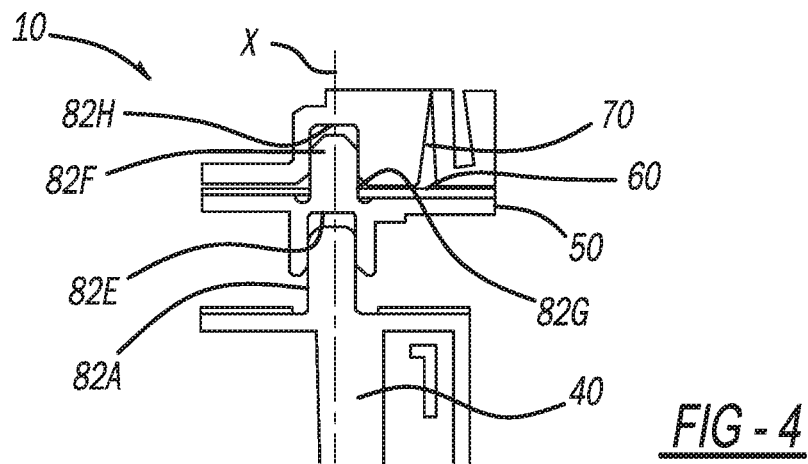
Figure 5:
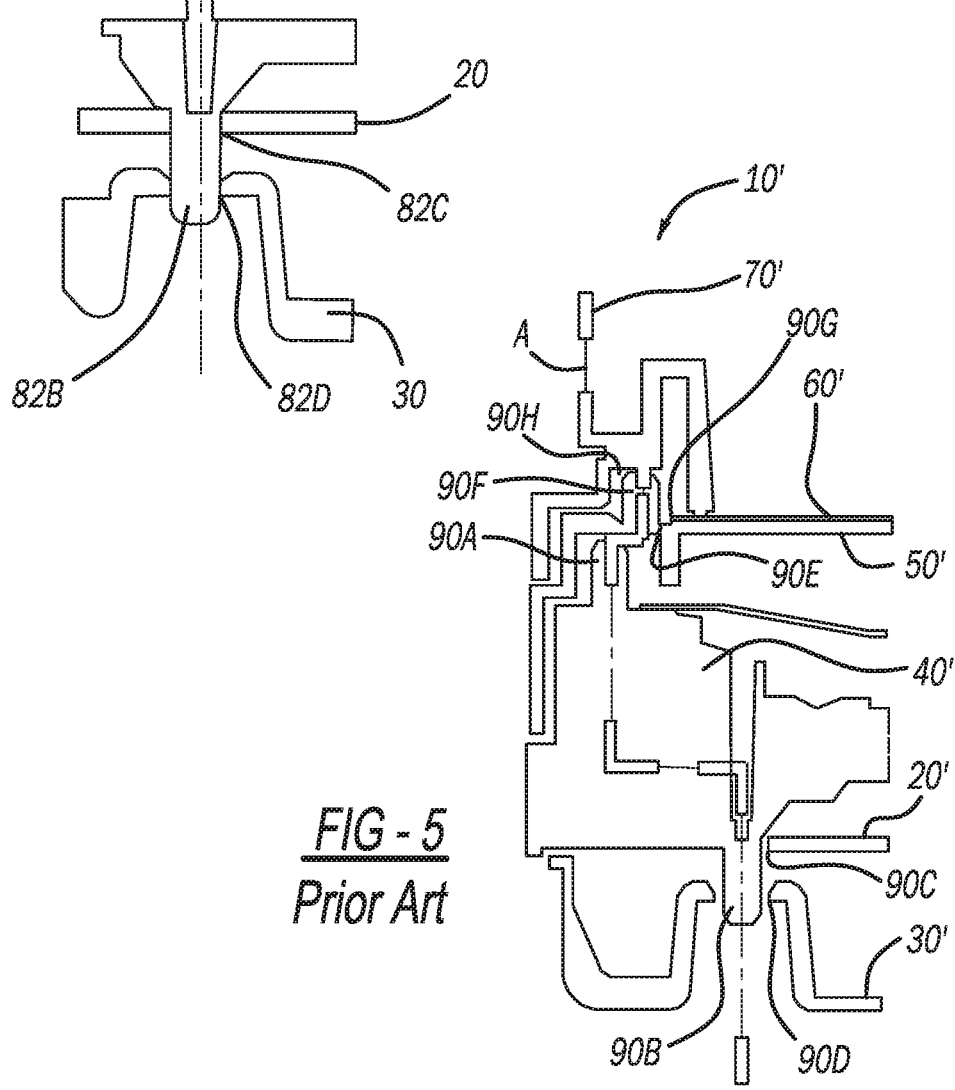

FIG. 1 an exploded view of a meter assembly in accordance with the present teachings taken from a first perspective;

FIG. 2 is an exploded view of the meter assembly of FIG. 1 taken from a second perspective;

FIG. 3 an exploded view of the meter assembly of FIG. 1 taken as a side view;

FIG. 4 illustrates components of the meter assembly of FIG. 1 aligned along a common axis; and FIG. 5 illustrates components of a prior art meter assembly not aligned along a common axis.

Corresponding reference numerals indicate corresponding parts throughout the several views of the drawings.

DETAILED DESCRIPTION

Example embodiments will now be described more fully with reference to the accompanying drawings.

With initial reference to FIGS. 1-3, a meter assembly in accordance with the present teachings is illustrated at reference numeral 10. The meter assembly 10 can be any suitable meter assembly, such as for an instrument panel of a vehicle. The meter assembly 10 can be configured for use with any vehicle, such as any suitable passenger vehicle, mass transit vehicle, motorcycle, construction equipment, military vehicle, watercraft, aircraft, all-terrain vehicle, snowmobile, etc.

The meter assembly 10 includes a plurality of plates that are stacked in alignment with one another. Any suitable number of plates can be included, such as three or more plates, four or more plates, five or more plates, or six or more plates. In the examples illustrated, the meter assembly 10 includes six plates. The plates of the exemplary meter assembly 10 illustrated include: a (main) printed circuit board (PCB) 20; a lower case 30; a main case 40; a sub-case 50; a main (instrument) dial 60; and a window plate 70.

The PCB 20 includes a plurality of light emitting elements, which can be light emitting diodes (LED) 22. The lower case 30 is arranged at a rear side of the PCB 20. The main case 40 is arranged at a front side of the PCB 20, such that the PCB 20 is between the lower case 30 and the main case 40. The main case 40 includes a plurality of first light reflectors 42.

At a front side of the main case 40 is the sub-case 50. The sub-case 50 includes a plurality of second light reflectors (or light chimneys) 52. The main dial 60 is at a front side of the sub-case 50, such that the sub-case 50 is between the main case 40 and the main dial 60. The main dial 60 includes a plurality of graphics 62. The graphics 62 can be any graphics suitable for conveying information to the driver regarding the status of the vehicle and various features thereof. For example, the graphics 62 may inform the driver whether or not the vehicle's high beams are on, vehicle tire pressure is low, vehicle oil level is low, washer fluid is low, the engine requires service, etc. The graphics 62 are aligned with the second light reflectors 52, which are aligned with the first light reflectors 42, which are aligned with the LEDs 22. Thus the LEDs 22 illuminate different ones of the graphic 62, and light from the LEDs 22 is directed to the graphic 62 by the first light reflectors 42 and the second light reflectors 52.

The window plate 70 is at a front side of the main dial 60. Thus the main dial 60 is between the window plate 70 and the sub-case 50. The window plate 70 defines a window 72, which allows the driver to view the main dial 60, as well as any other elements of the assembly 10 arranged behind the window plate 70, such as a display screen.

Each one of the plurality of plates includes a first alignment member 80A-80H, a second alignment member 82A-82H, and a third alignment member 84A-84H. The alignment members can be any suitable alignment members for aligning the plates 20, 30, 40, 50, 60, and 70 as illustrated in the figures. For example, the first, second, and third alignment members 80A-80H, 82A-82H, and 84A-84H, can be pins, holes, matches, receptacles, etc. The first alignment members 80A-80H are aligned along vertical alignment plane V of the assembly 10, which extends perpendicular to a horizontal alignment plane H of the assembly 10. The second alignment members 82A-82H and the third alignment members 84A-84H are aligned along the horizontal alignment plane H. The alignment members 80A-80H, 82A-82H, and 84A-84H are aligned along linear alignment axis Y, linear alignment axis X, and linear alignment axis X' respectively.

With respect to the first alignment members 80A-80H, the main case 40 includes the first alignment member 80A in the form of a front alignment pin extending from a front surface of the main case 40. The main case 40 also includes first alignment member 80B in the form of a pin extending from a rear surface of the main case 40. The main PCB 20 includes first alignment member 80C in the form of an alignment notch. The lower case 30 includes the first alignment member 80D in the form of a hole or receptacle. The first alignment members 80C and 80D are arranged to receive the first alignment member 80B, which in the example illustrated is a rear pin, of the main case 40. The sub-case 50 includes first alignment member 80E in the form of a receptacle, which is at a rear side of the sub-case 50 and arranged to receive the first alignment member 80A. On a front side of the sub-case 50 is first alignment member 80F, which in the example illustrated is a pin or post extending from the front side. Main dial 60 includes first alignment member 80G in the form of an alignment notch or hole, which is positioned to receive the first alignment member (alignment pin) 80F. The window plate 70 includes first alignment member 80H, which in the example illustrated is a hole or receptacle arranged to receive the front alignment pin 80F.

Each one of the first alignment members 80A-80H is aligned along the linear alignment axis Y in the example illustrated. The first alignment members 80A-80H restrict movement of the plates 20-70 in a longitudinal (up and down) direction. Although each one of the first alignment members 80A-80H is aligned directly along the linear alignment axis Y in the example illustrated, either one of the first alignment members 80A (front alignment pin of the main case 40) and 80B (rear alignment pin of the main case 40) may be offset along the vertical alignment plane V aligned with the linear alignment axis Y. In such applications, the first alignment members 80C and 80D would be repositioned to receive the first alignment member 80B. The first alignment member 80E would thus be repositioned to receive the first alignment member (front alignment pin) 80A. The first alignment members 80F, 80G, and 80H may be aligned with the first alignment members 80A and 80E as well, or vertically offset therefrom.

With respect to the second alignment members 82A-82H, the main case 40 includes the second alignment member 82A in the form of a front alignment pin extending from a front surface of the main case 40. The main case 40 also includes second alignment member 82B in the form of a pin extending from a rear surface of the main case 40. The main PCB 20 includes second alignment member 82C in the form of an alignment notch. The lower case 30 includes the second alignment member 82D in the form of a hole or receptacle. The second alignment members 82C and 82D are arranged to receive the second alignment member 82B, which in the example illustrated is a rear pin, of the main case 40. The sub-case 50 includes second alignment member 82E in the form of a receptacle, which is at a rear side of the sub-case 50 and arranged to receive the second alignment member 82A. On a front side of the sub-case 50 is second alignment member 82F, which in the example illustrated is a pin or post extending from the front side. Main dial 60 includes second alignment member 82G in the form of an alignment notch or hole, which is positioned to receive the second alignment member (alignment pin) 82F. The window plate 70 includes second alignment member 82H, which in the example illustrated is a hole or receptacle arranged to receive the front alignment pin 82F.

Each one of the second alignment members 82A-82H is aligned along the linear alignment axis X in the example illustrated. The second alignment members 82A-82H restrict movement of the plates 20-70 in a horizontal (left and right) direction. Although each one of the second alignment members 82A-82H is aligned directly along the linear alignment axis X in the example illustrated, either one of the second alignment members 82A (front alignment pin of the main case 40) and 82B (rear alignment pin of the main case 40) may be offset vertically. In such applications, the second alignment members 82C and 82D would be repositioned to receive the second alignment member 82B. The second alignment member 82E would thus be repositioned to receive the second alignment member (front alignment pin) 82A. The second alignment members 82F, 82G, and 82H may be aligned with the second alignment members 82A and 82E as well, or vertically offset therefrom.

With respect to the third alignment members 84A-84H, the main case 40 includes the third alignment member 84A in the form of a front alignment pin extending from a front surface of the main case 40. The main case 40 also includes third alignment member 84B in the form of a pin extending from a rear surface of the main case 40. The main PCB 20 includes third alignment member 84C in the form of an alignment notch. The lower case 30 includes the third alignment member 84D in the form of a hole or receptacle. The third alignment members 84C and 84D are arranged to receive the third alignment member 84B, which in the example illustrated is a rear pin, of the main case 40. The sub-case 50 includes third alignment member 84E in the form of a receptacle, which is at a rear side of the sub-case 50 and arranged to receive the third alignment member 84A. On a front side of the sub-case 50 is third alignment member 84F, which in the example illustrated is a pin or post extending from the front side. Main dial 60 includes third alignment member 84G in the form of an alignment notch or hole, which is positioned to receive the third alignment member (alignment pin) 84F. The window plate 70 includes third alignment member 84H, which in the example illustrated is a hole or receptacle arranged to receive the front alignment pin 84F.

Each one of the third alignment members 84A-84H is aligned along the linear alignment axis X' in the example illustrated. The third alignment members 84A-84H restrict movement of the plates 20-70 in a horizontal (left and right) direction. Although each one of the third alignment members 84A-84H is aligned directly along the linear alignment axis X' in the example illustrated, either one of the third alignment members 84A (front alignment pin of the main case 40) and 84B (rear alignment pin of the main case 40) may be offset vertically. In such applications, the third alignment members 84C and 84D would be repositioned to receive the third alignment member 84B. The third alignment member 84E would thus be repositioned to receive the third alignment member (front alignment pin) 84A. The third alignment members 84F, 84G, and 84H may be aligned with the third alignment members 84A and 84E as well, or vertically offset therefrom.

FIG. 4 is a cross-sectional view taken along line 4-4 of FIG. 1 with the meter assembly 10 in its assembled state with the plates 20, 30, 40, 50, 60, and 70 coupled together. As illustrated in FIG. 4, each one of the second alignment members 82A-82H is aligned along the same linear alignment axis X. The arrangement of the second alignment members 82A-82H of FIG. 4 is similar to, or the same as, the arrangement of the first alignment members 80A-80H (which are aligned along linear alignment axis Y) and the third alignment members 84A-84H (which are aligned along linear alignment axis X'.

The arrangement of FIG. 4 is in contrast to that of prior art FIG. 5. Prior art FIG. 5 illustrates a typical prior art meter assembly 10', which includes a main PCB 20', a lower case 30', a main case 40', a sub-case 50', a main dial 60', and a window plate 70'. Each one of the components of the prior art meter assembly 10' includes one or more coupling members 90A-90H, which are not aligned linearly along a straight line, but are rather staggered and offset from one another, such as along non-linear line A. The prior art configuration of FIG. 5 is difficult, time consuming, and costly to assemble at least because of difficulties associated with individually aligning the different plates 20', 30', 40', 50', 60', and 70' relative to one another. Furthermore, the prior art arrangement of FIG. 5 requires elongated light guides (chimneys), which may result in undesirable shadows at the main dial 60', for example. The present teachings advantageously overcome these issues with the prior art by positioning the alignment members 80A-80H, 82A-82H, and 84A-84H along first, second, and third linear alignment axes respectively. This reduces assembly time and cost, and allows the light reflectors (guides or chimneys) 42 and 52 to be made shorter, which allows the meter assembly 10 to have a reduced thickness.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A meter assembly for a vehicle instrument panel, the meter assembly comprising:
   a plurality of plates stacked in alignment with each other, each one of the plurality of plates includes a first alignment member, all of the first alignment members are aligned along a vertical alignment plane of the meter assembly, which extends perpendicular to a horizontal alignment plane of the meter assembly;
   the plurality of plates includes:
      a printed circuit board including a plurality of light emitting elements;
      a main case/housing including a plurality of first light guides aligned with the light emitting elements;

an instrument dial including graphics illuminated by
the light emitting elements;
a sub-case including a plurality of second light guides
aligned with the plurality of first light guides;
a back cover; and
a meter visor;
wherein each one of the plurality of plates further includes
a second alignment member and a third alignment
member, each one of the second alignment members
and the third alignment members are aligned along a
horizontal alignment axis;
wherein the back cover, the meter visor, the main case/
housing, and the sub-case include fixation members
that affix the plurality of plates in position relative to
one another subsequent to the plurality of plates being
aligned by the first alignment member, the second
alignment member, and the third alignment member;
wherein the fixation members of the meter visor and the
main case/housing interlock with each other and overlap the instrument dial; and
wherein each one of the fixation members is spaced apart
from, and does not engage, the first alignment members, the second alignment members, and the third
alignment members such that the fixation members
affix the plurality of plates independent of the first
alignment members, the second alignment members,
and the third alignment members.

2. The meter assembly of claim 1, wherein at least some of the first alignment members are aligned along a first linear alignment axis.

3. A meter assembly for a vehicle instrument panel, the meter assembly comprising:
a plurality of plates stacked in alignment with each other, each one of the plurality of plates includes a first alignment member and a second alignment member, all of the first alignment members are aligned along a first linear alignment axis of the meter assembly, and all of the second alignment members are aligned along a second linear alignment axis of the meter assembly;
the plurality of plates includes:
a printed circuit board including a plurality of light emitting elements;
a main case/housing including a plurality of first light guides aligned with the light emitting elements;
a sub-case including a plurality of second light guides aligned with the plurality of first light guides;
an instrument dial including graphics illuminated by the light emitting elements;
a window plate defining a window; and
a lower case at an end of the plurality of plates that is opposite to the window plate;
wherein the window plate, the lower case, the main case/housing, and the sub-case include fixation members that affix the plurality of plates in position relative to one another subsequent to the plurality of plates being aligned by the first alignment member and the second alignment member;
wherein the fixation members of the window plate and the main case/housing interlock with each other and overlap the instrument dial; and
wherein each one of the fixation members is spaced apart from, and does not engage, the first alignment members and the second alignment members such that the fixation members affix the plurality of plates independent of the first alignment members and the second alignment members.

4. The meter assembly of claim 3, wherein:
the first alignment member is one of a pin, a hole, a notch, and a receptacle; and
the second alignment member is one of a pin, a hole, a notch, and a receptacle.

5. The meter assembly of claim 3, wherein each one of the plurality of plates further includes a third alignment member, all of the third alignment members are aligned along a third linear alignment axis.

6. The meter assembly of claim 5, wherein the second linear alignment axis and the third linear alignment axis are arranged along a horizontal alignment plane of the meter assembly to restrict movement of the plurality of plates laterally relative to each another.

7. The meter assembly of claim 3, wherein the first linear alignment axis is arranged along a vertical alignment plane of the meter assembly to restrict movement of the plurality of plates longitudinally relative to each other.

8. The meter assembly of claim 3, wherein the plurality of second light guides are aligned with the light emitting elements.

9. The meter assembly of claim 3, wherein the plurality of plates includes at least three plates.

10. The meter assembly of claim 3, wherein the plurality of plates includes at least four plates.

11. The meter assembly of claim 3, wherein the plurality of plates includes at least five plates.

12. The meter assembly of claim 3, wherein the plurality of plates includes at least six plates.

13. A meter assembly for a vehicle instrument panel, the meter assembly comprising:
a printed circuit board including a plurality of light emitting elements;
a lower case on a rear side of the printed circuit board;
a main case on a front side of the printed circuit board, the main case includes a first plurality of light guides;
a sub-case on a side of the main case opposite to the printed circuit board, the sub-case including a second plurality of light guides aligned with the first plurality of light guides;
an instrument dial on a side of the sub-case that is opposite to the main case, the instrument dial including graphics illuminated by the light emitting elements;
a window plate on a side of the instrument dial opposite to the sub-case;
a plurality of first alignment members, each one of the printed circuit board, the lower case, the main case, the sub-case, the instrument dial, and the window plate includes one of the plurality of first alignment members;
a plurality of second alignment members, each one of the printed circuit board, the lower case, the main case, the sub-case, the instrument dial, and the window plate includes one of the plurality of second alignment members; and
a plurality of third alignment members, each one of the printed circuit board, the lower case, the main case, the sub-case, the instrument dial, and the window plate includes one of the plurality of third alignment members;
wherein:
all of the first alignment members are aligned along a first linear alignment axis of the meter assembly;
all of the second alignment members are aligned along a second linear alignment axis of the meter assembly;

fixation members affix the lower case, the main case, the sub-case, and the window plate in position relative to one another subsequent to being aligned by the first alignment member, the second alignment member, and the third alignment member;

the fixation members of the window plate and the sub-case interlock with each other and overlap the instrument dial; and each one of the fixation members is spaced apart from, and does not engage, the first alignment members, the second alignment members, and the third alignment members such that the fixation members affix the lower case, the main case, the sub-case, and the window plate independent of the first alignment members, the second alignment members, and the third alignment members.

14. The meter assembly of claim 13, wherein:

the first alignment member is one of a pin, a hole, a notch, and a receptacle; and the second alignment member is one of a pin, a hole, a notch, and a receptacle.

15. The meter assembly of claim 13, further comprising a plurality of third alignment members, each one of the printed circuit board, the lower case, the main case, the sub-case, the instrument dial, and the window plate includes one of the plurality of third alignment members;

wherein all of the third alignment members are aligned along a third linear alignment axis of the meter assembly.

16. The meter assembly of claim 15, wherein the second linear alignment axis and the third linear alignment axis are arranged along a horizontal alignment plane of the meter assembly to restrict movement of each one of the printed circuit board, the lower case, the main case, the sub-case, the instrument dial, and the window plate laterally relative to each another.

17. The meter assembly of claim 13, wherein the first linear alignment axis is arranged along a vertical alignment plane of the meter assembly to restrict movement of each one of the printed circuit board, the lower case, the main case, the sub-case, the instrument dial, and the window plate relative to each other.

* * * * *